April 23, 1963 M. N. LOPER 3,086,683
LIQUID DISPENSING DEVICE
Filed Feb. 24, 1960 3 Sheets-Sheet 1

*INVENTOR*
MARLIN N. LOPER

BY *John H. Widdowson*

*ATTORNEY*

INVENTOR
MARLIN N. LOPER
BY *John H. Widdowson*
ATTORNEY

April 23, 1963 M. N. LOPER 3,086,683
LIQUID DISPENSING DEVICE
Filed Feb. 24, 1960 3 Sheets-Sheet 3

INVENTOR
MARLIN N. LOPER
BY
ATTORNEY

United States Patent Office 3,086,683
Patented Apr. 23, 1963

3,086,683
LIQUID DISPENSING DEVICE
Marlin N. Loper, 1625 Arkansas, Wichita, Kans.
Filed Feb. 24, 1960, Ser. No. 10,612
6 Claims. (Cl. 222—183)

This invention relates to liquid dispensing means, and more particularly to a portable liquid dispensing device which is adapted to receive a bottle or container therein and to dispense liquid therefrom through an attached spout.

While portable liquid dispensing means are known to the prior art, the means for dispensing the liquid from the retained device is not effective. The valve and spout arrangement for the prior art is so arranged that it is often easy for the valve to be opened and liquid accidentally removed therefrom. A problem has thus existed in the art which has prevented manufacture and sale of a commercially successful device. Also the means in the prior art devices whereby atmospheric pressure is maintained in the bottom of the inverted container have not proved entirely effective, resulting in liquid in the container being lost therefrom by this ineffective structure. They do not provide convenient portability, for example from refrigerator to table and vice versa in the case of fresh milk jugs, while also providing for use without drip in storage on the refrigerator shelf or table.

In accordance with the present invention, means have been provided to overcome the deficiencies of the prior art devices as recited hereinbefore. The portable liquid dispensing device of this invention preferably has a spring biased valve therein which prevents accidental opening of the valve and loss of liquids in the container. The same spring biased means operates on the spout of the dispenser, preferably in conjunction with guide means, to rotate it when not in use to a position where the open end of the spout is facing up, which also helps prevent the accidental displacement of any liquids, drip and the like. A new and improved means of receiving the bottle or container have also been provided which prevents leakage between the bottle and/or container and the portion of the liquid dispensing device which receives the neck of the bottle. Also, the breather tube which connects the bottom of the inverted bottle with the atmosphere is preferably provided with a check valve which prevents loss of liquids while at the same time the air pressure in the inverted bottom of the bottle may be maintained at that of the atmosphere.

Accordingly it is an object of the present invention to provide a new and improved liquid dispensing device.

Another object of the persent invention is to provide a portable liquid dispensing device having means incorporated therein to prevent the accidental loss of liquids from the container.

A further object of this invention is to provide a liquid dispensing device having a spring biased valve and spout which operates to keep the valve in the closed position and the spout retracted and with the spout opening in the up position when the device is not in use.

Another object of the invention is to provide improved means for maintaining the air above the liquid in the bottom of the inverted bottle at atmospheric pressure without any loss of liquids from the container.

A further object of this invention is to provide a new guide means for the valve and spout of a dispensing device whereby the spout is rotated to the down position at the same time the valve is operated and the spout extended, and to the up position upon valve closing and spout retraction.

Various other objects, advantages and features of the invention will become apparent from the following description taken in connection with the accompanying drawings. The drawings which accompany and are a part of this disclosure depict preferred specific embodiments of the portable liquid dispensing device, and it is to be understood that these drawings are not to unduly limit the scope of the invention.

Figure 1:
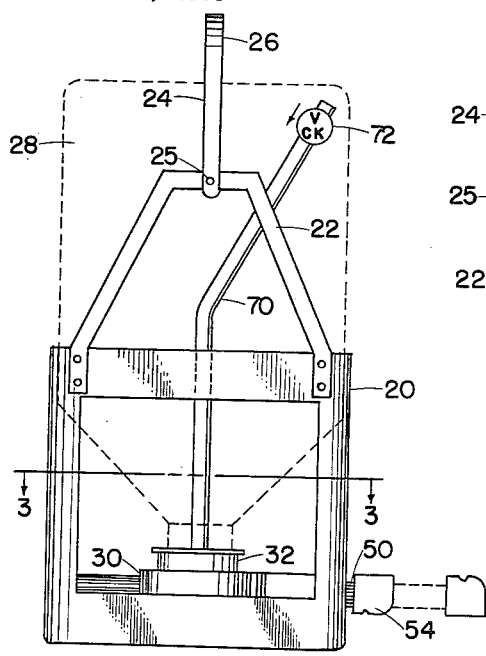
FIG. 1 is a side elevational view of the liquid dispensing portable fountain device of this invention.
Figure 2:
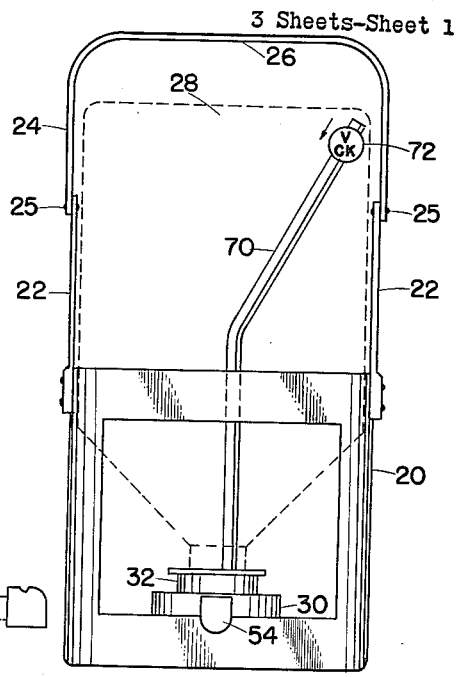
FIG. 2 is a front elevational view of same.
Figure 3:
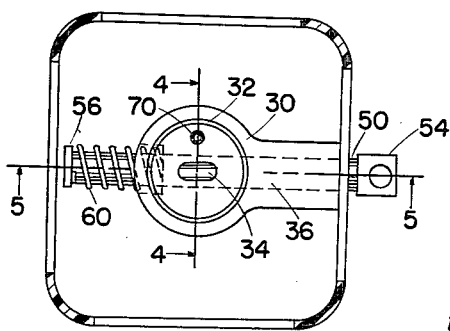
FIG. 3 is a cross section view taken along the line 3—3 of FIG. 1 looking in the direction of the arrows.
Figure 4:
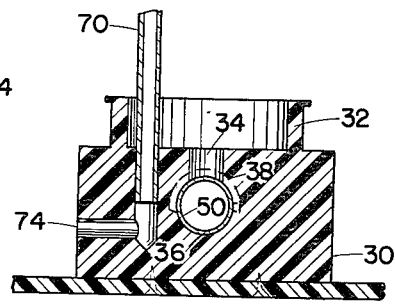
FIG. 4 is a cross section view taken along the line 4—4 of FIG. 3.

Referring now to the drawings in detail, whereon the same numerals are used to indicate the same or similar parts and/or assemblies, a generally square, open framework, preferably of plastic, is shown at 20. Side members 22 are suitably secured to opposite sides of the plastic framework and are joined at their upper ends to a strap handle 24 which extends between the two side members 22 and is pivotally secured thereto by pivots 25. The intermediate portion of the strap 24 is formed into a handle 26 which overlies the bottom of an inverted bottle and facilitates movement of the liquid dispensing device. A plastic valve block 30 is secured to the lower end of the open plastic framework on the bottom thereof. The valve block has an upwardly projecting annular portion 32 which is adapted to receive the neck of a bottle or container 28 therein. The dimension of the upwardly projecting annular portion 32 can, of course, be varied as necessary in order to receive any container, such as a jug or bottle, therein. The annular portion 32 is constructed to in use tightly grip the outer portion of the container, to thereby seal the container and the valve block and prevent any leakage of liquids from around the annular portion 32.

Figure 8:
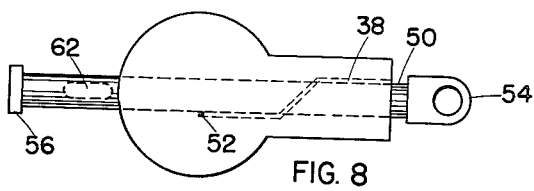
FIGS. 8, 9 and 10 are diagrammatic views showing the positioning bead and the spout in various positions as the spout is extended and the valve is opened.
Figure 9:
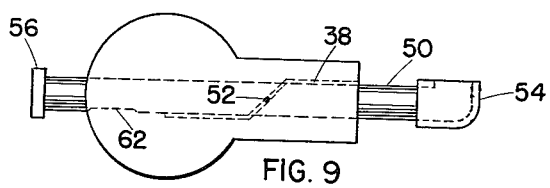
Figure 10:
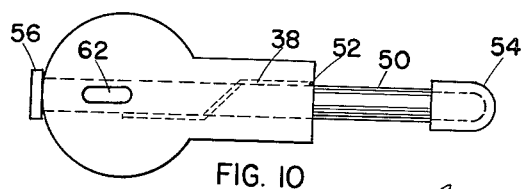

An opening 34 has been provided in the valve block approximately in the center of the annular plastic portion 32 which receives the neck of the bottle or jug. A through passageway 36 has been provided in the valve block 30 which extends the entire length of the valve block 30, and communicates with the valve opening 34 formed therein. A curved guide slot 38 is formed in the valve block 30 on the surface of the through passageway 36. As best seen in FIGS. 8 to 10, the guide slot 38 extends in a generally longitudinal direction a short distance from the center of the annular portion of the valve block 30, is curved about the outer surface of the through passageway approximately 180 degrees in a spiral manner, and then extends again in a longitudinal direction to the end of the guide block 30.

Figure 5:
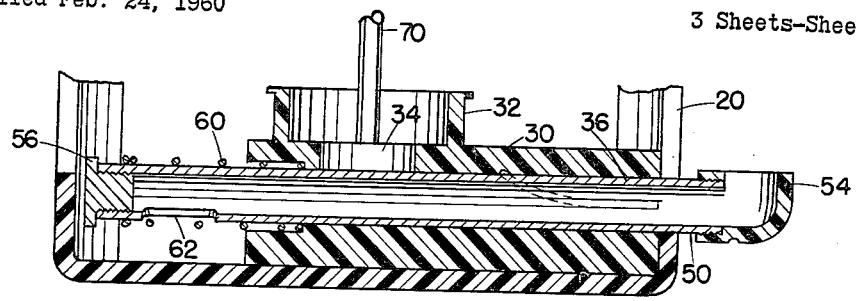
FIG. 5 is a cross section view taken along the line 5—5 of FIG. 3 showing the spring biased valve and spout arrangement in the retracted position.

A hollow tube 50 is received in the through passageway 36 and extends from both ends of the passageway. A bead 52 is secured to the outer surface of the hollow tube and in operation is received in the curved guide slot 38. A spout 54 is threadedly secured to the outer end of the hollow tube 50. The inner end of hollow tube 50 is closed by a retainer plug 56 which is threadedly received in the inside of the hollow tube 50. The outer surface of the retaining plug 56 is somewhat larger than the diameter of the hollow tube 50. As will be clear from the drawings, the closed inner end of the hollow tube 50 is entirely within the open plastic framework 20, extended or retracted, while the end of the tube 50 having the spout 54 thereon extends beyond the open framework 20 at the opposite side of the valve block 30. A spiral spring 60 encircles the closed end of the tube 50 and is compressed between the retaining plug 56 and the adjacent side of the valve block 30. The spiral spring 60 thus urges the hollow tube 50 to its retracted position within the valve block 30 as shown in FIG. 5. When the hollow tube 50 is in its retracted position, the bead 52 will engage the inner end of the curved guide slot 38 to limit further movement of the hollow tube 50 in the direction that is being urged by the spiral spring 60.

Figure 6:
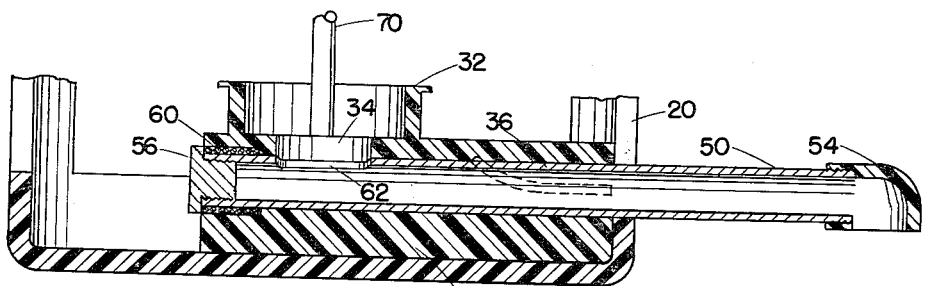
FIG. 6 is a cross section view similar to FIG. 5 showing the spout extended to the pouring position.

As will be seen from FIGS. 5 to 10 of the drawings, the structure previously described will allow the hollow tube 50 to be moved from its retracted position as shown in FIGS. 5 and 8 to an extended position as shown in FIGS. 6 and 10. As the tube 50 is moved against the compression of the spring 60, it will be guided by the bead 52 moving in the curved guide slot 38. The guided movement of tube 50 will first be in a general longitudinal direction, and then as the curved portion of the guide slot is reached, movement will continue in a longitudinal direction but will also cause the tube 50 to be rotated approximately 180 degrees, and then the tube 50 will again be moved in a longitudinal direction. As will be observed from FIGS. 5 to 10, movement of the hollow tube 50 from its retracted to its extended position will rotate the spout 54 from the position shown in FIGS. 5 and 8 in which the open part of the spout is facing upwardly, to the position shown in FIGS. 6 and 10 at which time the open end of the spout is facing downwardly. This movement is, of course, opposed by the spiral spring 60, and when the hollow tube 50 is released, the compression of the spring will cause the hollow tube 50 to be retracted into the valve block as shown in FIGS. 5 and 8.

An aperture 62 has been formed in the hollow tube 50 and is so positioned that when the hollow tube 50 is in the extended position shown in FIGS. 6 and 10, the aperture 62 will communicate with the opening 34 in the valve block 30. Thus any liquid in the bottle or container 28 can flow through the opening 34 and the aperture 62 into the hollow tube 50, and then along the length of the tube 50 through the spout 54 into a glass, cup, or other suitable receptacle, not shown.

As liquid is removed from the bottle or container 28 in the manner just described, an air pocket will be formed at the inverted bottom of the bottle or jug 28 when it is in an inverted position as shown in the figures. Unless some means are provided for maintaining this air pocket at atmospheric pressure, the flow of liquids from the container 28 will soon be impeded, if not altogether stopped. To accomplish this, an elongated vertical tube 70 is provided. This breather tube 70 is secured to the valve block 30 within the projecting annular plastic portion 32. The length of the vertical tube 70 should be such that the other end of the tube will be adjacent the bottom of the inverted bottle or container 28. Most jugs like 28 have a curved bottom to provide a slight recessed portion around the inner periphery. The inner end of tube 70 preferably projects into this recess. A check valve 72 has been provided in the end of the vertical tube which is adjacent the bottom of the bottle or container 28 so that liquids from the bottle or jug will not be allowed to pass along the breather tube 70 while air from the atmosphere will be admitted into the bottle 28. The tube 70 is threadedly received into the valve block 30, and communicates with the atmosphere through an opening 74 formed in the valve block.

To place a bottle or jug 28 in the liquid dispensing device of this invention, the top or lid of the bottle 28 is removed and the liquid dispensing device is placed over the bottle or container 28 so that the mouth of the container is received by the projecting annular plastic portion 32 of the device. The vertical tube 70, of course, will be placed within the container at the same time. The strap 24 and handle 26 may be rotated about the pivot 25 to allow the container to be easily received therein. While the open framework 20, together with the side members 22, is ordinarily sufficient to retain the jug or bottle within the device, the strap 24 may be made adjustable so that when it is again pivoted about the axis of pivot 25 to overlie the bottom of the bottle or jug 28 it can be pulled down tight thereon to additionally help retain the container in place. The device with the container thus in place is inverted to the position shown in FIG. 1. With the bottle or container 28 thus in place, liquid therein can be easily removed by merely pulling the spout 54 or hollow tube 50 from the retracted to the extended position, which will rotate the spout 54 to the down position and will align the openings 34 and aperture 62 in the valve block 30 and tube 50 respectively, thus allowing the liquid to flow through the tube 50 and out of the spout 54. In this position spout 54 will be quite extended, for example out over the edge of a shelf in a refrigerator or over the edge of a table for easy filling of a glass. The tube 50 will be returned to the retracted position by the action of the spiral spring 60 against the retaining plate 56 and side of the block 30, with spout 54 back out of the way of a refrigerator door. Continual flow of the liquid of the container 28 is assured by the breather tube 70 which keeps the air space in the bottom of the inverted container 28 at atmospheric pressure as previously described.

Figure 11:
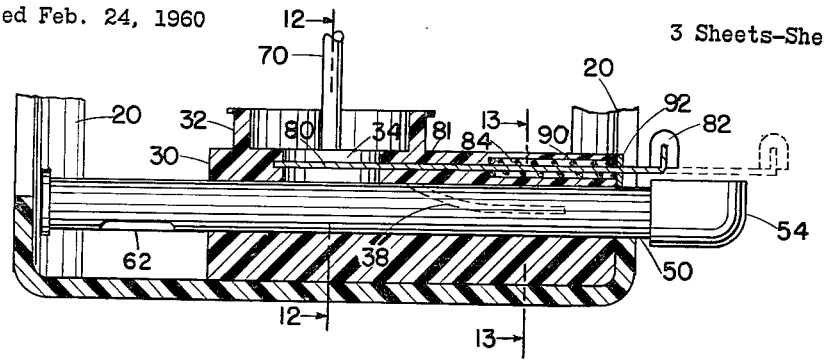
FIG. 11 is a cross section view showing the spout in a modified slide valve mechanism.
Figure 12:
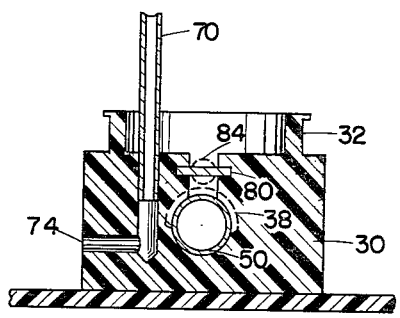
FIG. 12 is a cross section view along the line 12—12 of FIG. 11.
Figure 13:
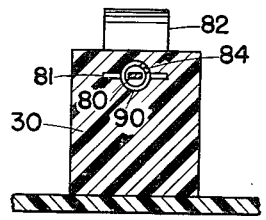
FIG. 13 is another cross section view of the modified slide valve mechanism of FIG. 11 taken along the line 13—13 of FIG. 11.
Figure 7:
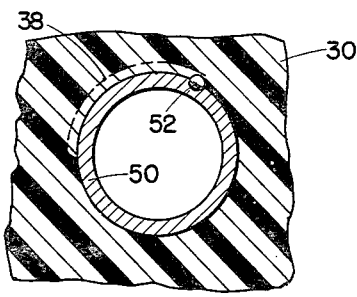
FIG. 7 is a cross section view showing the positioning bead in the guide slot.

Modified means for placing the opening 34 in the aperture 62 in communication with each other has been shown in FIGS. 11, 12 and 13. In this modification the spiral spring 60 has been eliminated and the hollow tube 50 and its connected spout 54 can be manually moved from the retracted to the extended position and will remain in this position until it is manually returned to the other position. When the hollow tube 50 is in the extended position, the opening 34 and aperture 62 will be separated by a flat metallic plate 80 which passes entirely through the opening 34 and prevents the passage of liquids therethrough. The valve plate 80 extends longitudinally from the opening 34 through the end of the valve block 30 and the open plastic framework 20 where it is then bent at a right angle and has a plastic handle 82 formed thereon. As will be seen from FIGS. 11 to 13, the plate 80 is directly over the hollow tube 50 and is spaced slightly therefrom. A portion of the valve block 30 has been cut away at 84 from the end of the valve block adjacent the handle 82. The cutaway portion 84 is preferably circular in cross section and is concentric with the center of a slot 81 through which the plate 80 is passed. The sides of the plate 80 from the handle 82 to the inner end of the cutaway portion 84 when the plate is in the position shown in the solid lines in FIG. 11, have been removed so that the width of the plate 80 in the cutaway portion 84 is less than the diameter of the cutaway portoin 84. A spiral spring 90 is placed in the cutaway portion 84 and is held therein by cover plate 92 which is secured to the side of the valve block 30 in any suitable manner. The inner end of spring 90 is suitably mounted to slide valve 80 to spring load same upon extension for automatically retracting the valve 80 upon release of handle 82. The cover plate 92 has an opening therein which will allow the end of valve plate 80 to pass therethrough, but which is small enough to retain the spiral spring 90 within the cutaway portion 84. The anti-friction properties of the plastic of which the valve block 30 is made will allow the plate 80 to be reciprocated in a longitudinal direction with very little effort, and will also help in forming a seal between the plate 80 and the valve block 30 when the plate 80 closes the opening 34.

To place the opening 34 in communication with the aperture 62, the hollow tube 50 is moved to the extended position as previously described in connection with FIGS. 5 to 10. And in this specific embodiment, as well as the first one described hereinbelow, the guide slot 38 and bead 52 can be reversed, if desired, that is, the slot in the tube 50 and the bead on the inner surface of the passageway 36. The opening 34 and aperture 62 will then be separated only by the plate valve 80. The plate 80 is removed from the opening 34 by moving the handle 82 from the position shown in the solid lines in FIG. 11 to that shown in the dotted lines. When this is done liquids in the container 28 can pass through the opening 34 and the aperture 62 into the hollow tube 50 and out the spout 54. When the handle 82 is moved in the manner just described, the spring 90 will be compressed between the end plate 92 and the flange of the plate 80 which is formed by cutting away a portion of the plate 80 along the length of the cutaway portion 84 in the valve block 30. The spiral spring 90 thus compressed continually urges the slide valve 80 to its retracted position across the opening 34, and when the handle 82 is released it will thus be moved across the opening and be in sealing engagement therewith.

The modification shown in FIGS. 11 to 13 will be particularly useful in a commercial establishment. The hollow tube 50 would then only be extended at the beginning of the working day and retracted at the end thereof. Whenever liquids needed to be dispensed, it would only be necessary for the handle 82 to be extended until the desired amount of liquid flows from the container 28, at which time the handle 82 is released and it, along with the plate 80 will be returned to the position to close the opening 34 by the action of the spiral spring 90.

I have found it preferable and advantageous to form the new portable fountain of my invention from the common suitable plastic materials of construction by the usual molding procedures, etc. As shown, the upper framework can be formed separate from the valve block 30, or if desired they can be made integral.

While the invention has been described in connection with a preferred embodiment thereof, it will be understood that this description is intended to illustrate and not limit the scope of the invention, which is defined by the appended claims.

It will be evident to those skilled in the art that various modifications of this invention can be made, or followed in the light of this disclosure and discussion, without departing from the spirit and scope of the disclosure and claims.

I claim:

1. A portable liquid dispensing device comprising, in combination, a generally square, open and integrally formed plastic framework having opposite side members, a strap secured between the upper ends of said side members, a handle on said strap, said strap and handle constructed and adapted to pass over the bottom of an inverted jug which is to be mounted in said framework between said side members, a plastic valve block secured in the bottom of said open framework, said valve block having an upwardly projecting, annular plastic portion constructed and adapted to receive the neck of a jug therein, an opening in the projecting plastic portion through which fluids can pass, a through passageway in said valve block communicating with said opening, a curved guide slot formed in said valve block in said through passageway, a hollow tube received in said through passageway and extending from both ends thereof, said tube being closed at one end and having a spout on the other end, a bead secured to the outer surface of said tube and received in said curved guide slot to guide said tube from an extended position with the spout turned down to a retracted position with the spout turned up, said spout being adjacent the outside of the open framework when the tube is retracted, an aperture in said tube intermediate its ends, said aperture communicating with said opening in the upwardly projecting plastic portion of said valve block when said tube is in the extended position only, a spring retaining plate on the closed end of said tube, a spiral spring encircling the closed end of said tube and being compressed between said spring retaining plate and one side of said valve block to bias said rod into the retracted position, and an elongated tube secured in one end portion to said valve block inside the projecting annular plastic portion thereof and extending therefrom and adapted to be positioned in the bottom of said jug when inverted, said tube communicating with the atmosphere through said valve block and having a check valve on the other end portion thereof and positioned within said jug to prevent passage of liquids from said jug while allowing air to pass from the atmosphere therethrough into said jug.

2. A portable liquid dispensing device comprising, in combination, a generally square open framework, a valve block in the lower end portion of said framework, said valve block having an upwardly projecting annular portion constructed and adapted to receive the neck of a bottle or jug therein, an opening in said valve block within said projecting annular portion through which fluids can pass, a passageway through said valve block communicating with said opening, a curved guide slot formed in said valve block in the surface of said passageway, a hollow tube slidably and rotatably mounted in said passageway and extending from both ends of said valve block, said hollow tube being closed at one end and having a spout on the other end thereof, a bead secured to the outer surface of said hollow tube and received in said curved guide slot to guide said hollow tube relative to said passageway, an aperture in said hollow tube intermediate its ends, said aperture communicating with said opening in said valve block when said hollow tube has been guided to its outermost position by said bead moving in said curved guide slot, spring means at one end of said hollow tube adapted to urge said hollow tube to a retracted position so that said aperture in said hollow tube is not in communication with said opening in said valve block, and tube means secured in one end portion to said valve block connecting the atmosphere to the air space in the bottom of an inverted container which can be received on said valve block, a check valve in the other end portion of said tube means to prevent loss of fluids from said container through said tube means.

3. A portable liquid dispensing device comprising, in combination, a generally square, open and integrally formed plastic framework having opposite side members, a strap secured between the upper ends of said side members, a handle on said strap, said strap and handle constructed and adapted to pass over the bottom of an inverted jug which is to be mounted in said open framework between said side members, a plastic valve block secured in the bottom of said open framework, said valve block having an upwardly projecting annular plastic portion constructed and adapted to receive the neck of a jug therein, an opening in the projecting plastic portion through which fluids can pass, a through passageway in said valve block communicating with said opening, a curved guide slot formed in said through passageway, a hollow tube received in said through passageway and extending from both ends thereof, said hollow tube being closed at one end and having a spout on the other end, a bead secured to the outer surface of said hollow tube and received in said curved guide slot to guide said hollow tube from an extended position with the spout turned down to a retracted position with the spout turned up, said spout being adjacent the outside of the open framework when said hollow tube is retracted, an aperture in said hollow tube intermediate its ends, said aperture communicating with said opening in the upwardly projecting plastic portion of said valve block when said hollow tube is in the extended position only, an elongated tube secured to said valve block inside the projecting annular plastic portion thereof, said elongated tube communicating with the atmosphere through said valve block and having a check valve on the end remote from said valve block to prevent passage of liquids while allowing air to pass from the atmosphere therethrough, a longitudinally extending plate passing through said framework and said valve block and across the portion of said valve block through which said aperture in said hollow tube communicates with the portion of said valve block which is adapted to receive said container therein, one end of said plate being reduced in width and passing through a cutaway portion in said valve block through the side of said valve block, a handle formed on the projecting end of said plate, a spiral spring within the cutaway portion of said valve block, said spiral spring being retained therein by a retaining plate secured to the side of said valve block over the end of said cutaway portion, said retaining plate having an opening therein which allows the passage of said longitudinal extending plate but prevents the spring from being removed from the cutaway portion of said valve block, said device being constructed and adapted so that when said hollow tube has been guided to the position where the aperture therein communicates with the portion of said valve block which receives said container therein, said longitudinally extending plate can be moved along its length so that said opening and said aperture are in communication with each other, said spiral spring continually urging said longitudinal plate into the closed position.

4. A liquid dispensing device comprising, in combination, an open plastic framework, a valve block connected to said framework, said valve block having a portion thereof adapted to receive the neck of a liquid container in sealing engagement, a through passageway in said valve block, guide means within said passageway, a hollow tube received in said passageway and extending from at least one end thereof, said hollow tube having means to cooperate with said guide means to effectively guide said hollow tube within said passageway, a spout secured to said hollow tube, an aperture in said hollow tube intermediate its ends, said aperture being so positioned that as said hollow tube is guided in said passageway said aperture can be placed in communication with said portion of said valve block which receives said container thereby forming a passage for the flow of liquids, a longitudinally extending plate passing through said framework into said valve block and positionable to open and close the communication between said aperture in said hollow tube and said portion of said valve block adapted to receive said container therein, one end of said plate being reduced in width and passing through a cut-away portion in said valve block through the side of said valve block, a handle formed on the projecting end of said plate, a spiral spring within the cut-away portion of said valve block, said spiral spring being retained therein by a retaining plate secured to the side of said valve block over the end of said cut-away portion, said retaining plate having an opening therein which allows the passage of said longitudinally extending plate but prevents the spring from being removed from the cut-away portion of said valve block, said longitudinally extending plate being movable to permit passage of fluids from said container into said hollow tube.

5. A liquid dispensing device comprising, in combination, a valve block having an opening therein, a portion of said valve block surrounding said opening being shaped and of size to sealingly receive the neck of a bottle or the like with the interior of said bottle being in fluid communication with said opening in said valve block when said bottle is mounted thereon, a passageway in said valve block intersecting and in fluid communication with said opening in said valve block, guide means on the inner surface of said passageway in said valve block, conduit means mounted in said passageway to move longitudinally relative thereto and to turn relative to said passageway and having one end portion thereof extending from said valve block, said one end portion of said conduit means having a portion for dispensing liquid therefrom with the axis of said last-named portion being at an angle to the axis of said one end portion of said conduit means and said conduit means being closed at the other end portion thereof, guide means on the outer surface of said conduit means engaging and cooperating with said guide means on said surface of said passageway to guide said conduit means in said passageway, said conduit means being constructed and adapted to move longitudinally relative to said passageway in said valve block into a retracted and an extended position, said conduit means when in said retracted position having the outlet of said portion for dispensing liquid facing upwardly in a non-dripping position and when in said extending position having said outlet of said portion for dispensing liquid facing downwardly in a dispensing position, one of said guide means being curved to cause said conduit means to turn when being extended to the dispensing position and to cause said conduit means to turn reversely when being retracted to the retracted position, an aperture in said conduit means positioned intermediate said end portions thereof and communicable with said opening in said valve block when said conduit means is in said extended and dispensing position and out of communication with said opening in said valve block when said conduit means is in said retracted position, and means connected to said valve block and positionable in a bottle or the like when positioned thereon and operable to provide gas to the bottle during dispensing of liquids therefrom.

6. A liquid dispensing device comprising, in combination, a valve block having an opening therein, a portion of said valve block surrounding said opening being shaped and of size to sealingly receive the neck of a bottle or the like with the interior of said bottle being in fluid communication with said opening in said valve block when said bottle is mounted thereon, a passageway in said valve block intersecting and in fluid communication with said opening in said valve block, a guide slot in the surface of said passageway in said valve block, said guide slot having a curved intermediate portion extending both circumferentially and longitudinally along said passageway, conduit means mounted in said passageway to move longitudinally relative thereto and to turn relative to said passageway and having one end portion thereof extending from said valve block, said one end portion of said conduit means having a portion for dispensing liquid therefrom with the axis of said last-named portion being at an angle to the axis of said one end portion of said conduit means and said conduit means being closed at the other end portion thereof, projecting means on the outer surface of said conduit means positioned in said guide slot in said passageway and movable therealong to guide said conduit means in said passageway, said conduit means being constructed and adapted to move longitudinally relative to said passageway in said valve block into a retracted and an extended position, said conduit means when in said retracted position having the outlet of said portion for dispensing liquid facing upwardly in a non-dripping position and when in said extended position having said outlet of said portion for dispensing liquid facing downwardly in a dispensing position, said projecting means on said conduit means and said guide slot in said passageway cooperating to cause said conduit means to turn when being extended to the dispensing position and to cause said conduit means to turn reversely when being retracted to said retracted position, an aperture in said conduit means positioned intermediate said end portions thereof and communicable with said opening in said valve block when said conduit means is in said extended and dispensing position and out of communication with said opening in said valve block when said conduit means is in said retracted position, and means connected to said valve block and positionable in a bottle or the like when positioned thereon and operable to provide gas to the bottle during dispensing of liquids therefrom.

References Cited in the file of this patent

UNITED STATES PATENTS

| | | |
|---|---|---|
| 1,207,505 | Cordley | Dec. 5, 1916 |
| 1,260,333 | Cordley | Mar. 26, 1918 |
| 1,629,303 | Phillips | May 17, 1927 |
| 1,768,091 | Adair | June 24, 1930 |
| 2,416,811 | Bailey | Mar. 4, 1947 |
| 2,935,232 | Thomas | May 3, 1960 |